(12) United States Patent
Chino et al.

(10) Patent No.: US 9,238,436 B2
(45) Date of Patent: Jan. 19, 2016

(54) MIRROR FOR VEHICLE

(75) Inventors: Masaru Chino, Kiryu (JP); Osamu Ichikawa, Kiryu (JP); Yukinori Suto, Kiryu (JP); Yoshitaka Kaneko, Kiryu (JP)

(73) Assignee: MITSUBA CORPORATION, Gunma (JP)

( * ) Notice: Subject to any disclaimer, the term of this patent is extended or adjusted under 35 U.S.C. 154(b) by 33 days.

(21) Appl. No.: 13/395,738

(22) PCT Filed: Sep. 29, 2010

(86) PCT No.: PCT/JP2010/066894
§ 371 (c)(1),
(2), (4) Date: Mar. 13, 2012

(87) PCT Pub. No.: WO2011/040430
PCT Pub. Date: Apr. 7, 2011

(65) Prior Publication Data
US 2012/0170146 A1    Jul. 5, 2012

(30) Foreign Application Priority Data

Sep. 30, 2009  (JP) ................................ 2009-227643
Mar. 4, 2010   (JP) ................................ 2010-047374

(51) Int. Cl.
*G02B 7/182*     (2006.01)
*B60R 1/072*     (2006.01)

(52) U.S. Cl.
CPC ...................................... *B60R 1/072* (2013.01)

(58) Field of Classification Search
CPC ................................ B60R 1/072; B60R 1/066
USPC ............................ 359/872, 876; 248/479, 481
See application file for complete search history.

(56) References Cited

U.S. PATENT DOCUMENTS 4,003,271 A * 1/1977 Stelma .......................... 74/502.1
6,168,279 B1 * 1/2001 Schnell ........................... 359/872

(Continued)

FOREIGN PATENT DOCUMENTS

JP      61-85538     6/1986
JP       6-30563     8/1994

(Continued)

OTHER PUBLICATIONS

Machine translation of JP 2002-46535 translated Aug. 24, 2013.*

(Continued)

*Primary Examiner* — Thomas K Pham
*Assistant Examiner* — Cara Rakowski
(74) *Attorney, Agent, or Firm* — Wenderoth, Lind & Ponack, L.L.P.

(57) ABSTRACT

A joint portion is provided to an upper case of a mirror unit tilting mechanism so as to protrude therefrom. A fitting portion is formed on a pivot plate side so as to correspond to the joint portion. The joint portion is formed into a hollow hemisphere shape. A support shaft is provided upright at a center portion of an outer wall, and a spherical portion is formed in the outer wall. The fitting portion has a hollow hemisphere dome shape and includes a spherical side wall portion and a ceiling portion which has a wave shape in cross section. The fitting portion is lightly press-fitted to the joint portion through one-touch insertion operation. The fitting portion and the joint portion are swingably connected to each other under a state in which curved surfaces of the spherical portion and the side wall portion are held in contact with each other.

5 Claims, 12 Drawing Sheets

(56) References Cited

U.S. PATENT DOCUMENTS

| | | | |
|---|---|---|---|
| 2002/0063978 A1* | 5/2002 | Guttenberger et al. | ....... 359/877 |
| 2003/0086189 A1 | 5/2003 | Tsuyama et al. | |
| 2007/0212164 A1 | 9/2007 | Bosse et al. | |

FOREIGN PATENT DOCUMENTS

| | | |
|---|---|---|
| JP | 8-104172 | 4/1996 |
| JP | 2002-46535 | 2/2002 |
| JP | 2002-337609 | 11/2002 |
| JP | 2003-205785 | 7/2003 |
| JP | 2003-312365 | 11/2003 |
| JP | 2007-507673 | 3/2007 |

OTHER PUBLICATIONS

Machine translation of JP 2003-205785 translated Mar. 10, 2014.*
English translation of the International Preliminary Report on Patentability issued May 18, 2012 in International (PCT) Application No. PCT/JP2010/066894.
International Search Report issued Dec. 14, 2010 in International (PCT) Application No. PCT/JP2010/066894.

* cited by examiner

LONGITUDINAL DIRECTION

SECTION M-M

SECTION N-N (A) PRIOR ART (B) PRIOR ART (54)

MIRROR FOR VEHICLE

TECHNICAL FIELD

The present invention relates to a mirror for a vehicle, which is to be mounted on an automobile or the like. More particularly, the invention relates to a tilting joint structure in a mirror tilting mechanism for a door mirror for an automobile.

BACKGROUND ART

In a mirror for a vehicle for providing a driver or the like with rearward visibility, such as a door mirror for an automobile, in order to maintain an optimum mirror angle, a mirror unit tilting mechanism is housed inside a mirror body. FIG. 14 is an explanatory view illustrating a structure of a conventional mirror unit tilting mechanism. As illustrated in FIG. 14, a door mirror 51 includes a set plate 52 fixed onto the vehicle body side of the automobile, and a mirror body 53 rotatably fitted onto the set plate 52. Inside the mirror body 53, a remote control unit 54 including a motor and the like is housed. The remote control unit 54 includes upper and lower cases 55a and 55b. A pivot plate 57 is fitted to the case 55a via a joint 56. A mirror 58 is fixed to the pivot plate 57.

The pivot plate 57 is swingably fitted between the joint 56 and the case 55a. With this, the mirror 58 is swingable in the arrow X direction, and the reflection angle of the mirror can be adjusted as appropriate. The pivot plate 57 includes a concave portion 59 formed into a spherical shape. Meanwhile, a concave portion 61 is also formed on an upper surface portion of the case 55a. The concave portion 61 has a spherical shape which enables mounting of the concave portion 59. The pivot plate 57 is fitted onto the case 55a in a manner so that an outer surface portion of the concave portion 59 is provided in sliding contact with an inner surface side of the concave portion 61. Onto an inner surface side of the concave portion 59, the joint 56 having a spherical lower surface portion is fitted. The joint 56 is fixed with a screw 63 to a cylindrical boss portion 62 protruding from an upper surface of the case 55a. A spring 65 is interposed between the joint 56 and a flange 64 of the screw 63. The pivot plate 57 is provided in press contact with the case 55a by an elastic force of the spring 65.

Further, generally, a mirror to be mounted on the door mirror for vehicle includes a mirror main body and a mirror holder for holding the mirror main body. The mirror holder is mounted on a mirror surface angle adjusting device provided to a door mirror housing via the pivot plate. FIGS. 15(A) and 15(B) are explanatory views illustrating a conventional mirror main body fixing structure. In the conventional door mirror, a mirror main body 81 is fixed to a mirror holder 82 by sandwiching the mirror main body 81 in a thickness direction thereof between a lip 84 formed at an end portion of a flange portion 83 of the mirror holder 82 and a protrusion member 85 formed on a bottom surface portion of the mirror holder 82. Further, as illustrated in FIG. 15(B), the protrusion member 85 has a shape of a cantilever J so as to easily cause elastic deformation (Patent Document 3).

Patent Document 1: Japanese Utility Model Examined publication No. Hei 06-30563
Patent Document 2: Japanese Patent Application Laid-open No. Hei 08-104172
Patent Document 3: Japanese Patent Application Laid-open No. 2003-205785

However, in the conventional tilting mechanism illustrated in FIG. 14, the joint 56 is fixed with the screw 63, and the pivot plate 57 is sandwiched between the joint 56 and the case 55a. Therefore, there have been problems that the number of components is large and assembly man-hours increase. As a result, there has been a problem in that the manufacturing cost of the mirror for vehicle increases, which hinders manufacturing cost reduction.

Further, the protrusion member 85 formed on the bottom surface portion of the mirror holder 82 is generally formed into a cantilever shape. Hence, due to the deterioration over time thereof, the elasticity is liable to decrease, which makes it impossible to sandwich the mirror main body 81 at a predetermined pressing force in some cases. When the pressing force for sandwiching the mirror main body 81 decreases, the mirror surface deflection is easily caused, and thus there is a fear that, for example, the rearward image on the mirror main body 81 is disturbed. As a countermeasure, adhesive tape (for example, butyl tape) K is interposed between the mirror main body 81 and the bottom surface portion of the mirror holder 82 in a manner avoiding the protrusion member 85 of the mirror holder 82, so as to reinforce the fixing strength of the mirror main body 81 with respect to the mirror holder 82. As a result, problems of increase in number of components, cumbersome working, and increase in manufacturing cost have been caused.

It is an object of the present invention to reduce the number of components and assembly man-hours of a mirror for vehicle, and further to reduce a manufacturing cost thereof.

SUMMARY OF THE INVENTION

The present invention provides a mirror for a vehicle, including: a case member housed inside a mirror body to be fixed to a vehicle side; a pivot plate fitted to the case member; and a mirror fitted to the pivot plate. The case member includes a joint portion including a spherical portion formed into a spherical shape. The pivot plate includes a fitting portion including: a spherical side wall portion formed to have the same curvature as the spherical portion; and a ceiling portion provided integrally with the spherical side wall portion, the ceiling portion being bent to have a wave shape in cross section. The pivot plate is swingably fitted to the case member by press-fitting the fitting portion and the joint portion to each other.

According to the present invention, the case member includes the joint portion including the spherical portion. Further, the pivot plate includes the fitting portion including the spherical side wall portion and the ceiling portion having a bending shape in cross section. Then, the fitting portion and the joint portion are press-fitted to each other, to thereby swingably fit the pivot plate to the case member. As a result, it is possible to fit the pivot plate to the case member through one-touch insertion operation, and the assembly man-hours can be reduced. Further, a joint member between the case member and the pivot plate becomes unnecessary, which makes it possible to reduce the number of components.

In the above-mentioned mirror for vehicle, the joint portion may be formed into a hollow shape, and may include an outer wall having the spherical portion formed in an outer peripheral surface thereof. Further, the spherical side wall portion of the fitting portion may be provided in close contact with the outer wall of the joint portion under a state in which the fitting portion is press-fitted to the joint portion. Further, the joint portion may include a support shaft provided upright at a center portion thereof, the support shaft having a spherical upper surface, and the ceiling portion of the fitting portion may be provided with a spherical concave portion which abuts against the spherical upper surface of the support shaft under a state in which the fitting portion is press-fitted to the joint portion. The spherical concave portion is formed at a center portion of the ceiling portion, and is formed to have the same curvature as the spherical upper surface of the support shaft.

Meanwhile, the mirror for a vehicle may further include a rib (lip) piece for regulating a bending deformation of the pivot plate, the rib piece being provided on an outer peripheral portion of the fitting portion. Further, the mirror for vehicle may further include a rib (lip) piece provided between the fitting portion protruded from the pivot plate and a wall surface portion provided to the pivot plate so as to be opposed to an outer peripheral portion of the fitting portion, the rib piece connecting the outer peripheral portion of the fitting portion and the wall surface portion. With this rib piece, it is possible to improve the rigidity of the pivot plate, and to suppress the occurrence of mirror surface deflection due to the vibration from the vehicle body side or the like.

In addition, the fitting portion may include a protrusion for regulating an axial movement of a pivot spring to be mounted to the outer peripheral portion of the fitting portion, the protrusion being provided on the outer peripheral portion of the fitting portion. Further, the pivot spring may be arranged between the protrusion and the rib piece, and may be held between an upper surface of the rib piece and the protrusion. With this, it is possible to reliably mount the pivot spring to a predetermined position, and to prevent a situation in which the spring is slipped out.

Meanwhile, the present invention provides a mirror for vehicle, including a mirror main body and a mirror holder. The mirror holder includes a bottom surface portion, a flange portion provided upright from a peripheral edge of the bottom surface portion, and a rib formed at an end portion of the flange portion. The bottom surface portion is provided with a protrusion member, the protrusion member including an elastic protrusion having a wave shape with a ridge line perpendicular to a longitudinal direction of the mirror, and a support protrusion formed on a surface of the elastic protrusion having a wave shape. The mirror main body is fixed by being sandwiched between the rib and the protrusion member in a thickness direction of the mirror main body.

The mirror holder may be provided with an opening portion at the bottom surface portion thereof, the opening portion being opposed to a rear surface side of the protrusion member, and the protrusion member may be provided upright from a periphery portion of the opening portion. Further, a thickness of the elastic protrusion may be set smaller than a thickness of the bottom surface portion of the mirror holder. Further, the mirror holder may include an elastic support protrusion at the bottom surface portion thereof, the elastic support protrusion being provided in a direction of the flange portion on an outer side with respect to a position at which the protrusion member is formed. In addition, the mirror holder may include a bending portion at a portion at which the bottom surface portion is connected to the flange portion.

EFFECTS OF THE INVENTION

According to the mirror for vehicle of the present invention, the mirror for vehicle including the case member housed inside the mirror body, the pivot plate swingably fitted to the case member, and the mirror fitted to the pivot plate, the case member includes the joint portion including the spherical portion and the pivot plate includes the fitting portion including the spherical side wall portion and the ceiling portion having a bending shape in cross section, and the fitting portion and the joint portion are press-fitted to each other. In this manner, the pivot plate is swingably fitted to the case member. Thus, the pivot plate can be fitted to the case member through one-touch insertion operation, which makes it possible to reduce the assembly man-hours. Further, it is possible to omit the joint member between the case member and the pivot plate, which makes it possible to reduce the number of components.

Further, according to the mirror for vehicle of the present invention, the rib piece for regulating the bending deformation of the pivot plate is provided on the outer peripheral portion of the fitting portion. In this manner, it is possible to improve the rigidity of the pivot plate, and to suppress the occurrence of mirror surface deflection due to the vibration from the vehicle body side or the like.

Meanwhile, the mirror main body is sandwiched between the rib and the protrusion member of the mirror holder in the thickness direction thereof. In this manner, it is possible to firmly fix the mirror main body to the mirror holder without using adhesive tape or the like. This structure enables reduction in number of components and reduction in operation man-hours. As a result, the cost can be reduced. Further, because the mirror main body and the mirror holder can be firmly fixed to each other, the problem of mirror surface deflection can be remedied.

The opening portion is provided in the bottom surface portion of the mirror holder, and the protrusion member is provided upright from the periphery portion of the opening portion. Thus, the protrusion member can be easily formed. Further, the protrusion member is formed into a double supported beam shape, and hence it is possible to avoid elasticity reduction due to the deterioration over time, and to firmly fix the mirror main body to the mirror holder.

The elastic protrusion is formed thinner than the bottom surface portion of the mirror holder. In this manner, elastic deformation is easily caused, and the mirror main body and the mirror holder can be easily assembled and fixed to each other.

The elastic support protrusion is provided on the bottom surface portion of the mirror holder on the outer side with respect to the protrusion member forming position in the flange direction. In this manner, with the reaction force received from the elastic support protrusion, it is possible to prevent generation of strain to be formed at the mirror peripheral edge portion when the mirror main body is fixed to the mirror holder.

The mirror holder includes the bending portion at the portion at which the bottom surface portion is connected to the flange portion. In this manner, the mirror holder can possess a spring effect. Therefore, an appropriate holding force of the mirror main body can be achieved, and the assembly operation can be facilitated. Further, owing to the spring effect of the mirror holder, heat stress to be generated in the mirror holder can be alleviated. With this, under an environment with temperature change, it is possible to prevent strain to be generated in the mirror main body due to the heat stress.

Figure 1:
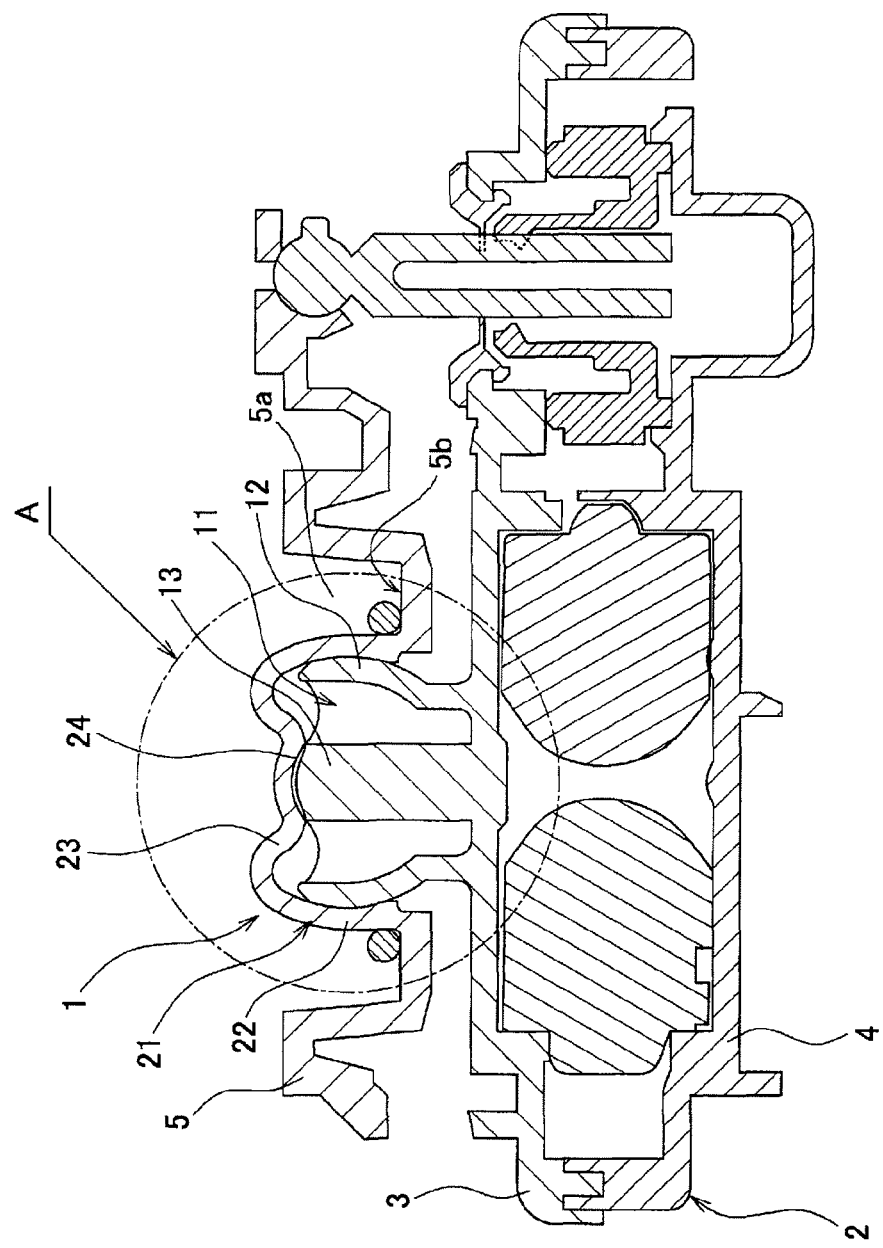
FIG. 1 An explanatory view illustrating a structure of a mirror unit tilting mechanism corresponding to a first embodiment of the present invention.

EXPLANATION OF REFERENCE SYMBOLS 1 mirror unit tilting mechanism
2 remote control unit
3 upper case (case member)
4 lower case
5 pivot plate
5a concave portion
5b bottom surface
11 joint portion
12 outer wall
12a cylindrical portion
12b spherical portion
13 support shaft
13a top end portion
14 bridge portion
21 fitting portion
22 side wall portion
23 ceiling portion
24 concave portion
25 pivot spring
31 mirror unit tilting mechanism
32 pivot plate
32a upper surface
33 rib (rib piece)
33a upper surface
34 fitting portion
34a outer peripheral portion
35 surrounding wall
36 inner wall surface (wall surface portion)
37 concave portion
38 spring engagement claw (protrusion)
41 mirror
42 mirror plate holding portion
43 plate main body portion
51 door mirror
52 set plate
53 mirror body
54 remote control unit
55a, 55b case
56 joint
57 pivot plate
58 mirror
59 concave portion
61 concave portion
62 boss portion
63 screw
64 flange
65 spring
C clearance
71 mirror holder
72 mirror main body
72a glass surface
73 bottom surface portion
73a opening
74 flange portion
75 protrusion member
75a support protrusion
75b elastic protrusion having wave shape
75c opening portion
76 elastic support protrusion
77 lip
78 mirror
79 bending portion
81 mirror main body
82 mirror holder
83 flange portion
84 lip
85 protrusion member
J cantilever
K adhesive tape
L mirror peripheral edge portion

DETAILED DESCRIPTION OF THE INVENTION

Hereinafter, embodiments of the present invention are described in detail with reference to the drawings.

First Embodiment

Figure 2:
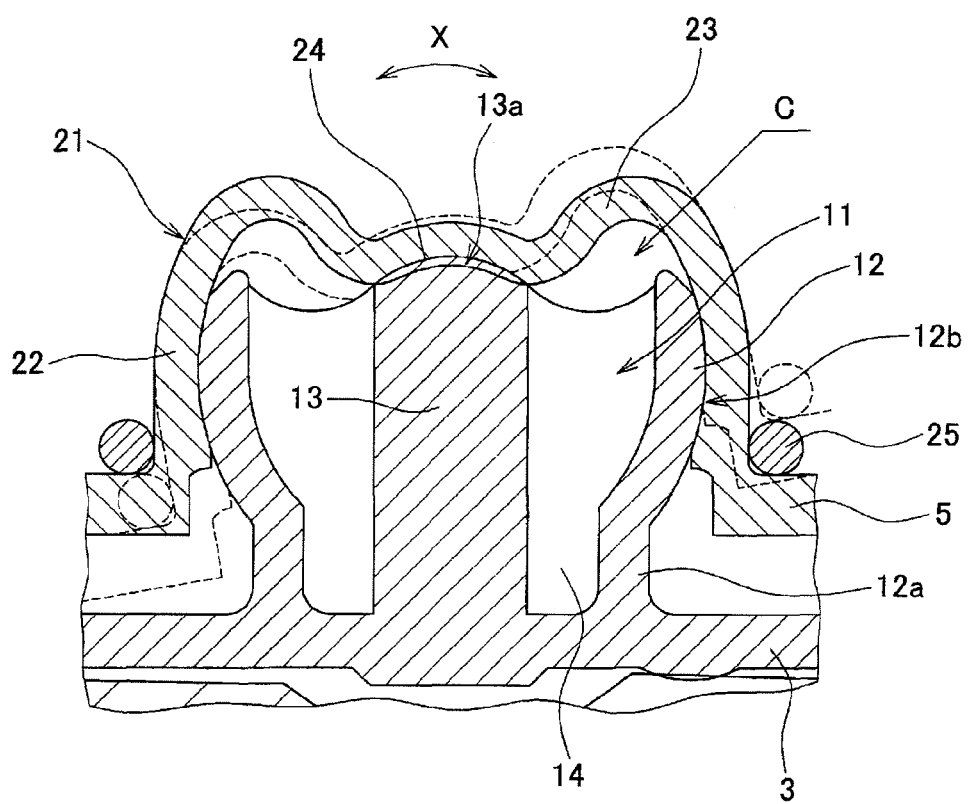
FIG. 2 An enlarged view of part A of FIG. 1.

FIG. 1 is an explanatory view illustrating a structure of a mirror unit tilting mechanism 1 corresponding to a first embodiment of the present invention, and FIG. 2 is an enlarged view of part A of FIG. 1. Note that portions other than the tilting mechanism are the same as those of the conventional door mirror illustrated in FIG. 14, and in the following embodiments, description thereof is omitted.

As illustrated in FIG. 1, also in the mirror unit tilting mechanism 1 of the present invention, a remote control unit 2 includes an upper case (case member) 3 and a lower case 4 each made of a synthetic resin. A pivot plate 5 made of a synthetic resin is fitted onto the upper case 3. Similarly to the case of FIG. 14, a mirror (not shown) is fixed to the pivot plate 5. The pivot plate 5 is swingably fitted onto the upper case 3. Together with the pivot plate 5, the mirror is swingable in the arrow X direction of FIG. 2.

Figure 14:
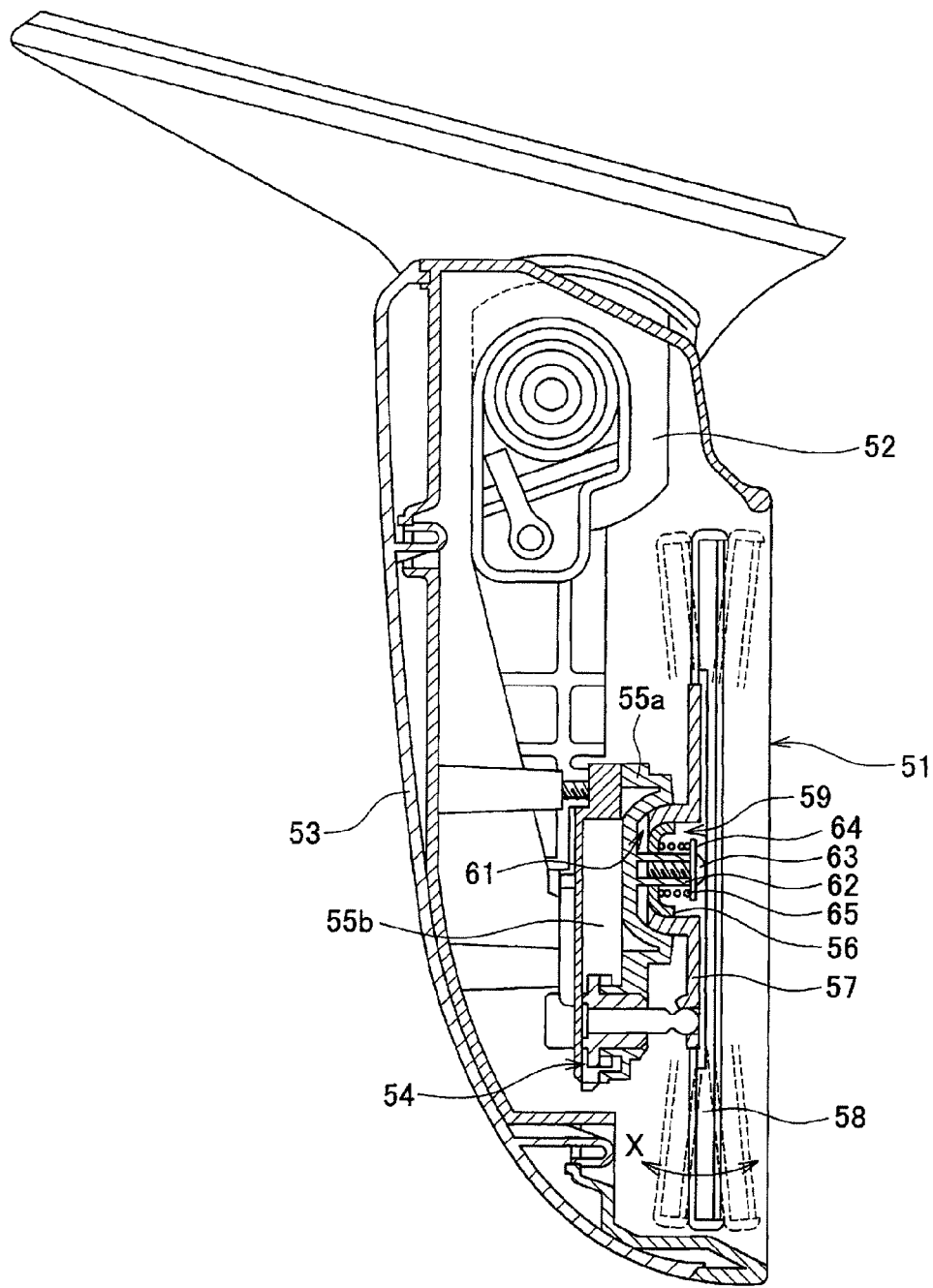
FIG. 14 An explanatory view illustrating a structure of a conventional mirror unit tilting mechanism.
Figure 15:
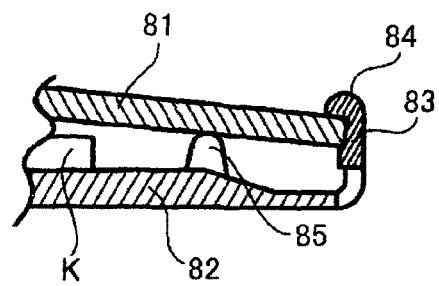
FIGS. 15(A) and 15(B) are explanatory views illustrating a conventional mirror main body fixing structure.
Figure 15:
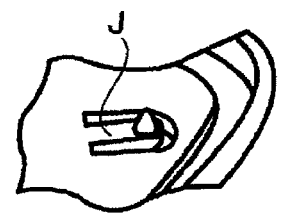

Here, unlike the door mirror in FIG. 14, the door mirror does not use a joint member (joint 56 in FIG. 14), and the pivot plate 5 is directly fitted to the upper case 3. As illustrated in FIGS. 1 and 2, a joint portion 11 protrudes on the upper surface side of the upper case 3. In contrast, also in the pivot plate 5, a fitting portion 21 is formed so as to protrude correspondingly to the joint portion 11. The fitting portion 21 is formed so as to protrude from a bottom surface 5b of a concave portion 5a formed in the pivot plate 5. The pivot plate 5 is swingably mounted to the joint portion 11 via the fitting portion 21. Note that the pivot plate 5 includes a part which slides with respect to the upper case 3. Hence, the pivot plate 5 is preferred to be made of a synthetic resin different from that for the upper case 3 (for example, ABS for the upper case 3, and PP for the pivot plate 5).

Figure 3:
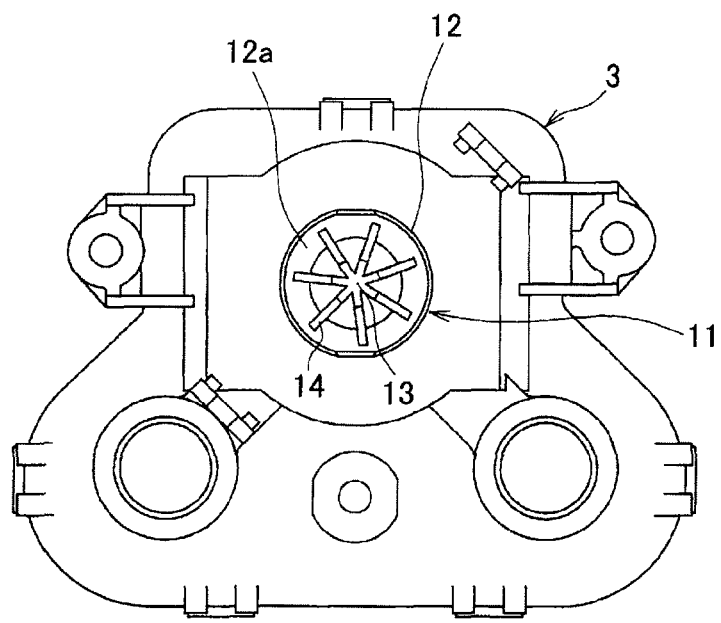
FIG. 3 A plan view of an upper case.
Figure 4:
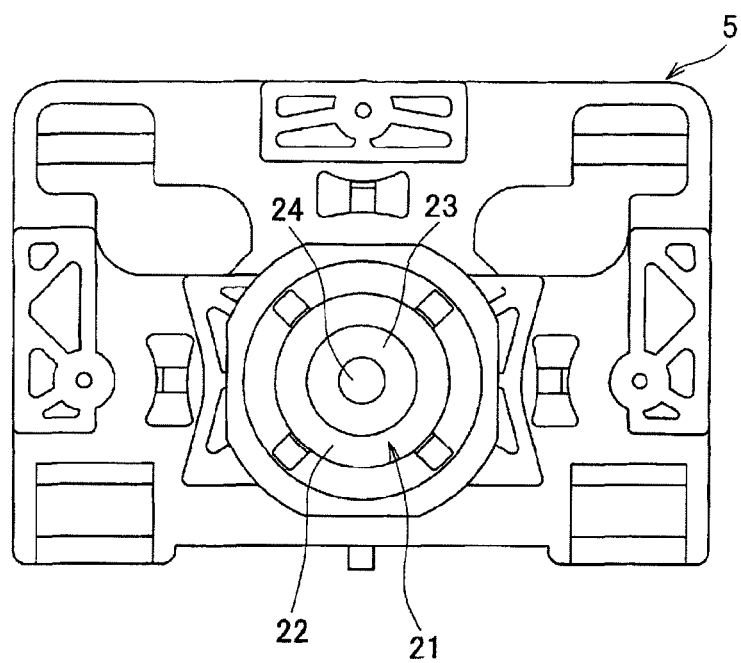
FIG. 4 A plan view of a pivot plate to be used in the mirror unit tilting mechanism of FIG. 1.

FIG. 3 is a plan view of the upper case 3, and FIG. 4 is a plan view of the pivot plate 5. As illustrated in FIGS. 3 and 4, the joint portion 11 and the fitting portion 21 have a circular shape when viewed from above. The joint portion 11 and the fitting portion 21 are respectively provided at substantially centers of the upper case 3 and the pivot plate 5. As illustrated in FIGS. 1 and 2, the joint portion 11 is formed into a hollow hemisphere shape. At a center portion of an outer wall 12 of the joint portion 11, a support shaft 13 is provided upright. The support shaft 13 has an asterisk shape in cross section. A top end portion 13a of the support shaft 13 is formed into a spherical shape. Around the support shaft 13, a plurality of bridge portions 14 are radially and equiangularly formed. The outer end side of each of the bridge portions 14 is connected to the outer wall 12. A base portion of the outer wall 12 corresponds to a cylindrical portion 12a. On the upper side of the cylindrical portion 12a, a spherical portion 12b whose outer peripheral surface is a sphere surface is formed.

The fitting portion 21 has a hollow hemisphere dome shape. The fitting portion 21 includes a spherical side wall portion 22 and a ceiling portion 23. The ceiling portion 23 is provided integrally with the side wall portion 22 on the upper side of the side wall portion 22. In the fitting portion 21, an inner peripheral surface of the side wall portion 22 is formed as a curved surface (spherical surface) having the same curvature as the spherical portion 12b of the joint portion 11. As illustrated in FIGS. 1 and 2, the ceiling portion 23 has a wave shape in cross section by being bent into a W-shape. As illustrated in FIG. 4, the ceiling portion 23 has a concentric wave pattern when viewed from above. At a center portion of the ceiling portion 23, a spherical concave portion 24 is formed. An inner peripheral surface of the concave portion 24 is formed as a curved surface (spherical surface) having the same curvature as the top end portion 13a of the support shaft 13. As described above, in the fitting portion 21, the ceiling portion 23 is bent and formed into a wave pattern, and hence the side wall portion 22 is elastically deformable in the radial direction.

Figure 5:
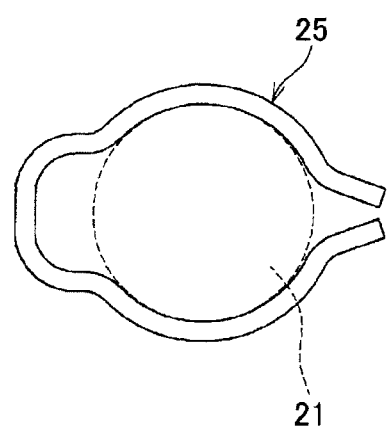
FIG. 5 A plan view of a pivot spring.

In the tilting mechanism 1, the pivot plate 5 is fitted to the upper case 3 by lightly press-fitting the fitting portion 21 to the joint portion 11. At this time, a pivot spring 25 for preventing slip out as in FIG. 5 is mounted to a base portion of the fitting portion 21. In this manner, the slipping out of the fitting portion 21 is prevented. When the fitting portion 21 is fitted to the joint portion 11, the side wall portion 22 of the fitting portion 21 is brought into close contact with the spherical portion 12b of the joint portion 11. As described above, the side wall portion 22 and the spherical portion 12b are spherical surfaces having the same curvature. Therefore, as indicated by the broken lines in FIG. 2, the fitting portion 21 and the joint portion 11 are swingably connected to each other under a state in which both of the spherical surfaces are held in contact with each other.

At the time of the fitting of the pivot plate 5, because the fitting portion 21 has an elastically deformable structure as described above, the fitting portion 21 is fitted to the joint portion 11 while the side wall portion 22 is enlarged in the radial direction. That is, the pivot plate 5 is fittable to the upper case 3 through one-touch insertion operation. As a result, screwing operation as in FIG. 14 becomes unnecessary, and it is possible to reduce assembly man-hours for the upper case 3 and the pivot plate 5. Further, a joint member between the upper case 3 and the pivot plate 5 also becomes unnecessary, and hence the number of components is reduced. Still further, owing to the spring effect obtained by the R-shape of the ceiling portion 23, it is possible to naturally absorb the dimension error between the joint portion 11 and the fitting portion 21 and the backlash at the connection portion due to the deterioration over time. Thus, the component accuracy required for the upper case 3 and the pivot plate 5 is relaxed. In addition, the force to be received by the upper case 3 when the pivot plate is mounted or the like can be efficiently absorbed owing to the spring effect of the fitting portion 21, and thus the durability is also improved.

Meanwhile, the pivot plate 5 is fitted to the upper case 3 while possessing a sliding resistance in accordance with a tightening margin of the fitting portion 21. Further, with this tightening margin and the overlapping amount of the curved surfaces, the swinging torque of the pivot plate 5 (mirror) is adjusted. Therefore, when the backlash is generated between the joint portion 11 and the fitting portion 21, it becomes impossible to suitably adjust the swinging torque. Regarding this problem, in the tilting mechanism 1, the backlash at the connection portion is absorbed by the spring effect on the fitting portion 21 side. Therefore, without cumbersome adjustment work, the swinging torque of the mirror can be suitably maintained for a long period of time.

Further, in the fitting portion 21, as illustrated in FIG. 2, the ceiling portion 23 has the R-shape (wave shape). Hence a clearance (part C in FIG. 2) between a rounded inner surface of an outer diameter portion of the ceiling portion 23 of the fitting portion 21 and an upper surface of the outer wall 12 of the joint portion 11 can be secured while maintaining the component strength. That is, the wave pattern functions as a rib to secure the strength of the ceiling portion 23, and further, the rounded inner surface of the outer diameter portion of the ceiling portion 23 stands further upward (i.e., higher) than the rounded inner surface of center concave portion 24 to secure the clearance C. As illustrated in FIG. 2, the clearance C is responsible for the swinging angle of the pivot plate 5. Therefore, as the clearance C increases, the swinging angle of the pivot plate 5 also increases. In the tilting mechanism 1, the clearance C is greatly secured by the R-shape of the ceiling portion 23. With this, it has become possible to set the swinging angle of the pivot plate 5 large while securing the component strength.

Second Embodiment

Figure 6:
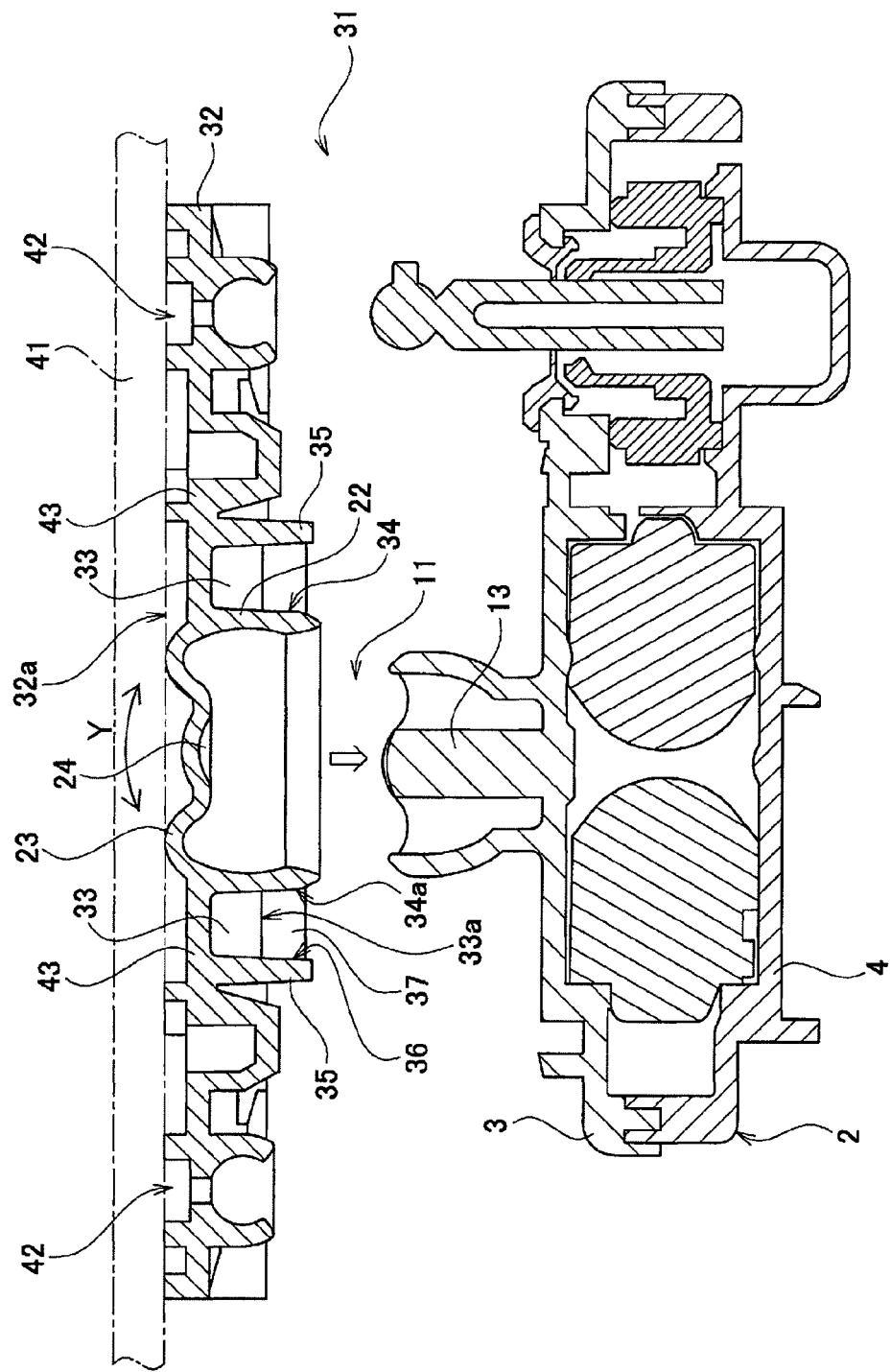
FIG. 6 An explanatory view illustrating a structure of a mirror unit tilting mechanism corresponding to a second embodiment of the present invention.
Figure 7:
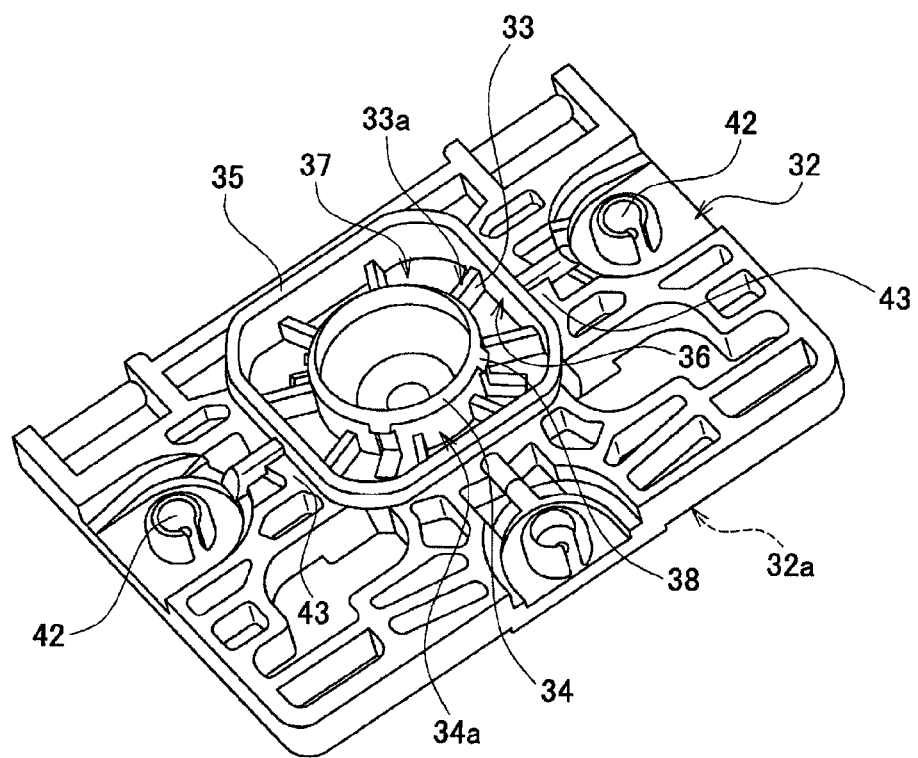
FIG. 7 A perspective view of a pivot plate to be used in the mirror unit tilting mechanism of FIG. 6, when viewed from a bottom surface direction thereof.

Next, a mirror unit tilting mechanism 31 corresponding to a second embodiment of the present invention is described. FIG. 6 is an explanatory view illustrating a structure of the mirror unit tilting mechanism 31, and FIG. 7 is a perspective view of a pivot plate 32 to be used in the mirror unit tilting mechanism 31 of FIG. 6, when viewed from a bottom surface direction (upper case 3 side) thereof. Note that, in the second embodiment, members and parts similar to those of the first embodiment are represented by the same reference symbols, and description thereof is omitted.

As described above, in the mirror unit tilting mechanism 1 illustrated in FIG. 1, the pivot plate 5 is fittable to the upper case 3 through one-touch insertion operation. Meanwhile, the fitting portion 21 provided upright in a dome shape is set to have a small thickness so as to secure the forming accuracy. Therefore, the pivot plate 5 is liable to elastically warp with the fitting portion 21 as a center, and there is a fear that, due to the vibration transmitted from the vehicle body side or the like, the mirror vibrates, to thereby cause mirror surface deflection. In view of this, in the mirror unit tilting mechanism 31 of the second embodiment, in order to suppress the mirror surface deflection, ribs (rib piece) 33 for reinforcement are provided around the fitting portion, thereby improving the strength of the pivot plate.

As illustrated in FIG. 7, a plurality of (eight in this case) ribs 33 are radially provided to an outer peripheral portion 34a of a fitting portion 34. Here, in the pivot plate 5 of the first embodiment, the pivot spring 25 is fitted to the fitting portion 21. Therefore, when the ribs are formed on the outer periphery side of the fitting portion 21, the pivot spring 25 cannot be fitted to the outer periphery of the fitting portion. Therefore, in the mirror unit tilting mechanism 31 of the second embodiment, as illustrated in FIG. 6, the concave-convex relationship of the fitting portion in the pivot plate is reversed. That is, the fitting portion 34 is provided upright from the upper surface side of the pivot plate 32. With this, the ribs 33 can be formed while securing the mounting place of the pivot spring 25.

In the pivot plate 32 of the second embodiment, unlike the earlier pivot plate 5, the fitting portion 34 protrudes from an upper surface 32a side of the pivot plate 32 toward the upper case 3. A surrounding wall 35 is provided upright outside the fitting portion 34 so as to surround the fitting portion 34. An inner wall surface (wall surface portion) 36 of the surrounding wall 35 is opposed to the outer peripheral portion 34a of the fitting portion 34. A concave portion 37 is formed between the surrounding wall 35 and the fitting portion 34. The ribs 33 are provided so as to be wall-like inside the concave portion 37. An inner end side of each of the ribs 33 is connected to the fitting portion 34, and an outer end side thereof is connected to the surrounding wall 35. The periphery of the fitting portion 34 is pressed by the ribs 33, to thereby regulate the vibration of the fitting portion 34 itself. Further, the bending rigidity of the pivot plate 32 in the arrow Y direction (see FIG. 6) is increased.

The pivot plate 32 is provided with the fitting portion 34 at the center thereof. At both end portions of the plate, mirror plate holding portions 42 to which the mirror 41 is to be fixed are formed. Between the fitting portion 34 and the mirror plate holding portions 42, the above-mentioned surrounding wall 35 is provided upright from a plate main body portion 43. Here, if the ribs 33 are not provided between the surrounding wall 35 and the fitting portion 34, the plate main body portion 43 is easily bent in the Y direction with the fitting portion 34 as a center. In contrast, in the mirror unit tilting mechanism 31, as is understood from FIG. 6, the bending rigidity of the pivot plate 32 in the Y direction is increased by the ribs 33, and thus a structure having higher rigidity than that of the pivot plate 5 of the first embodiment is achieved.

Figure 8:
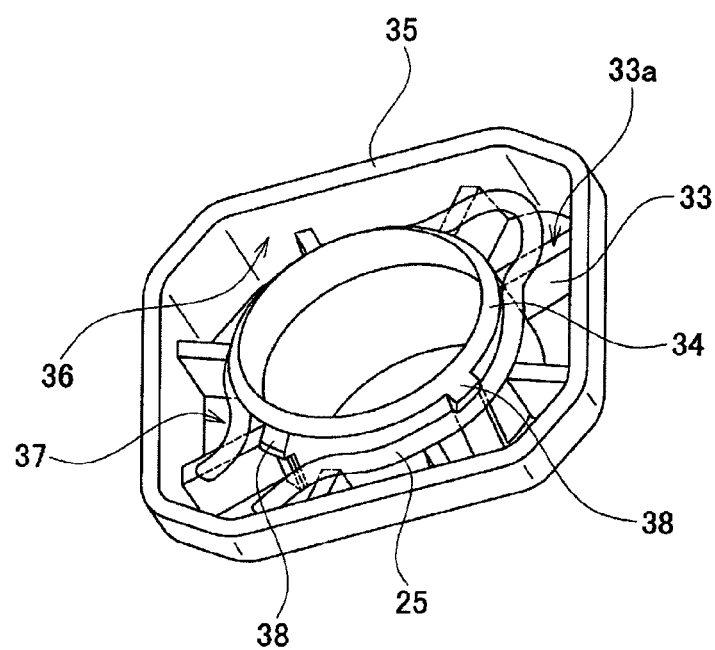
FIG. 8 An explanatory view illustrating a fitting state of a pivot spring in the mirror unit tilting mechanism of FIG. 6.

The pivot spring 25 is fitted to the outer peripheral portion 34a of the fitting portion 34. Because the pivot spring 25 is to be fitted, the ribs 33 are formed up to a substantially center portion of the side wall portion 22 from the upper surface 32a side of the pivot plate. The pivot spring 25 is mounted to a position capable of abutting against upper surfaces 33a of the ribs 33. Meanwhile, on the outer peripheral portion 34a of the fitting portion 34, spring engagement claws (protrusions) 38 protrude. As illustrated in FIG. 8, the pivot spring 25 is sandwiched between the rib upper surfaces 33a and the spring engagement claws 38. The pivot spring 25 is mounted on the outer peripheral portion 34a of the fitting portion 34 so that the vertical movement of the pivot spring 25 is regulated. Note that the height of the rib 33 is set so that the fitting position of the pivot spring 25 becomes substantially the same as in the case of the first embodiment.

Also in the mirror unit tilting mechanism 31, similarly to the fitting portion 21 of the first embodiment, the fitting portion 34 includes the side wall portion 22 and the ceiling portion 23. Further, at the center of the ceiling portion 23, the concave portion 24 is formed. Then, similarly to the above-mentioned case, the fitting portion 34 is lightly press-fitted to the joint portion 11 to be fitted to the upper case 3. That is, the pivot plate 32 is fitted to the upper case 3 through one-touch insertion operation. Therefore, similarly to the case of the first embodiment, the screwing operation is unnecessary, and the joint member is also unnecessary.

As described above, in the mirror unit tilting mechanism 31 of the second embodiment, the concave-convex relationship of the fitting portion in the pivot plate is reversed from that of the pivot plate 5 of the first embodiment. Then, around the fitting portion 34, the ribs 33 for regulating the bending deformation of the pivot plate 32 are formed, to thereby improve the rigidity of the pivot plate 32. In this manner, it is possible to prevent elastic warping of the pivot plate 32, and also possible to prevent mirror surface deflection due to the vibration from the vehicle body side or the like. Further, in the mirror unit tilting mechanism 31, the spring engagement claws 38 are provided on the outer peripheral portion 34a of the fitting portion 34, and the pivot spring 25 is held between the engagement claws 38 and the rib upper surfaces 33a. Thus, the pivot spring 25 can be reliably mounted at a predetermined position. Further, it is possible to prevent a situation in which the spring is slipped out so that reliability of the product is improved.

Third Embodiment

Figure 9:
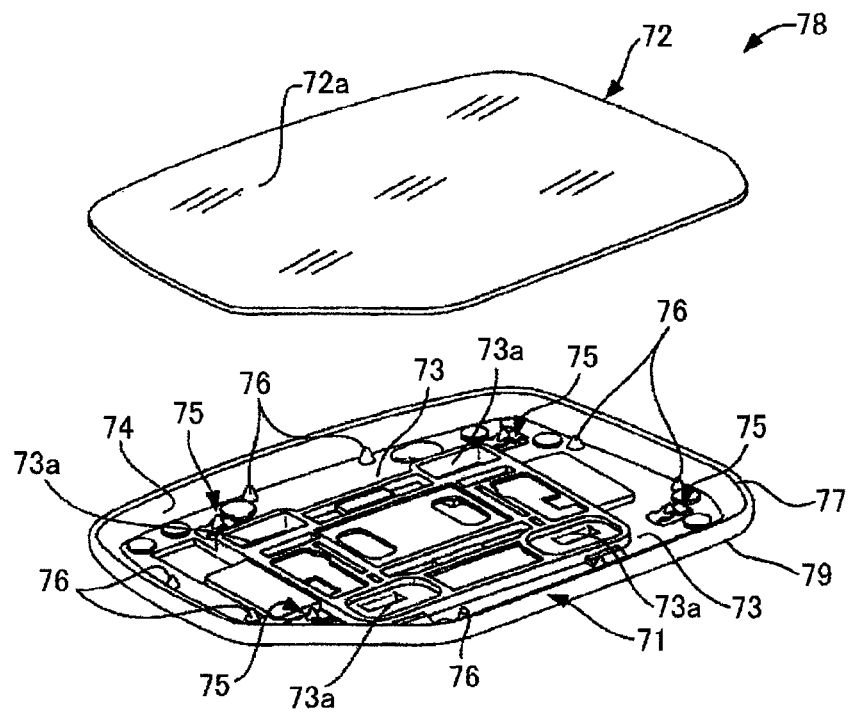
FIG. 9 An exploded perspective view illustrating a mirror main body and a mirror holder of a mirror for vehicle corresponding to a third embodiment of the present invention.

Further, a door mirror corresponding to a third embodiment of the present invention is described. FIG. 9 illustrates a mirror main body 72 and a mirror holder 71, which form a mirror 78 to be mounted on the door mirror for vehicle. Generally, the mirror 78 is fitted to a mirror surface angle adjusting device which is mounted on a door mirror housing main body via a pivot holder (not shown). In the mirror holder 71, a plurality of openings 73a for mounting the pivot holder are formed. Generally, a second surface mirror is used as the mirror main body 72. In the second surface mirror, a metal coating film is formed on one surface of a glass, and a protective film is formed further on the metal coating film. The second surface mirror is a mirror capable of checking the visibility in a direction opposite to the surface on which the metal film and the protective film are formed.

The mirror main body 72 has a visibility area satisfying the vehicle design and the legal visibility requirements. In this embodiment, the mirror main body 72 has a polygonal shape. The mirror holder 71 to which the mirror main body 72 is fitted has an outer peripheral shape along the shape of the mirror main body 72. The mirror holder 71 includes a bottom surface portion 73, a flange portion 74 provided upright from an end portion of the bottom surface portion 73, and a lip 77 formed at an end portion of the flange portion 74. In the bottom surface portion 73, there are formed protrusion members 75 for sandwiching and fixing the mirror main body 72, and elastic support protrusions 76.

When the mirror main body 72 is fitted to the mirror holder 71, the mirror holder 71 is warmed up in advance, and then the mirror main body 72 is set into the mirror holder 71. A side surface of the mirror main body 72 is brought into contact with the flange portion 74 of the mirror holder. Further, owing to the protrusion members 75 and the lip 77 formed at the end portion of the flange portion 74, the lip 77 is brought into contact with a glass surface 72a. The protrusion members 75 are brought into contact with the protective film surface of the mirror main body 72, and the mirror main body 72 is fixed to the mirror holder 71 under a state in which the mirror main body 72 is sandwiched in a thickness direction thereof.

The mirror holder 71 includes a plurality of elastic support protrusions 76. The elastic support protrusions 76 are formed on an outer side with respect to the positions at which the protrusion members 75 are formed (i.e., formed on the outer side from the protrusion member forming positions in the direction of the flange portion 74). The elastic support protrusions 76 are provided in order to prevent strain in the mirror surface to be formed at a mirror peripheral edge portion (region L illustrated in FIG. 11) when the mirror main body 72 is fixed to the mirror holder 71, through use of the reaction force of the elastic support protrusions 76.

Figure 10:
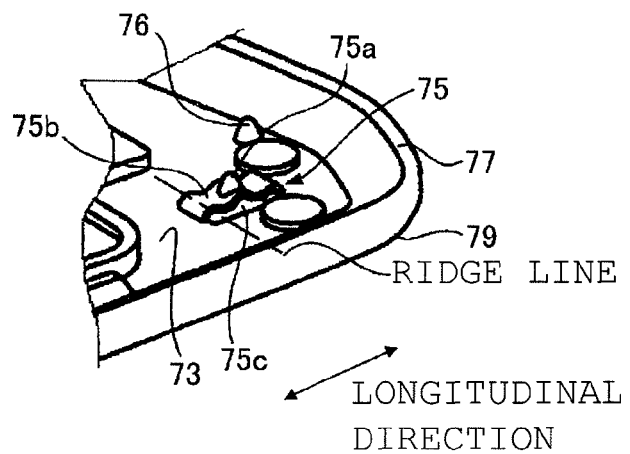
FIG. 10 An enlarged perspective view illustrating a protrusion member formed on the mirror holder of the mirror for vehicle of FIG. 9.

FIG. 10 is an enlarged view illustrating the protrusion member 75 formed in the mirror holder 71 and the elastic support protrusion 76 formed on the outer side of the protrusion member 75. The protrusion member 75 includes an elastic protrusion 75b having a wave shape, and a support protrusion 75a formed on the surface of the elastic protrusion 75b. An opening portion 75c is opened and formed in the bottom surface portion 73 of the mirror holder 71, and the elastic protrusion 75b is formed at a peripheral edge of the opening portion 75c. The elastic protrusion 75b protrudes from two sides of the opening portion 75c, the two sides opposing in a longitudinal direction of the mirror holder 71, and has a ridge line shape orthogonal to the longitudinal direction of the mirror holder.

The thickness of the elastic protrusion 75b is formed smaller than the thickness of the bottom surface portion 73 of the mirror holder 71. The support protrusion 75a has a cone shape, and is formed integrally with the elastic protrusion 75b. Note that the opening portion 75c is formed through insertion of a mold for forming the protrusion member 75.

Figure 11:
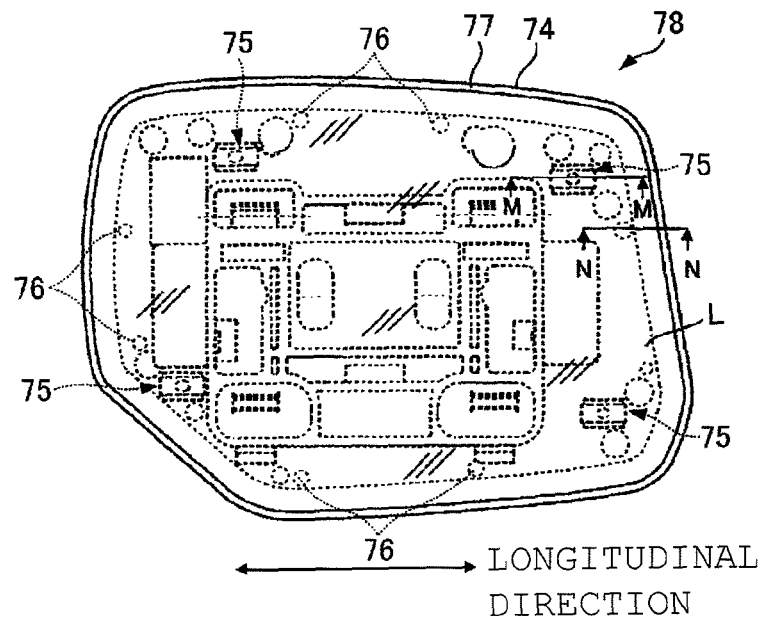
FIG. 11 A front view illustrating the mirror main body and the mirror holder of the mirror for vehicle of FIG. 9.
Figure 12:
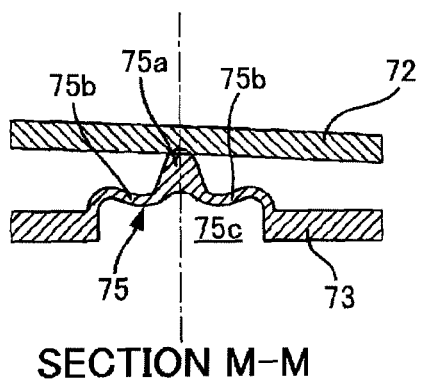
FIG. 12 A sectional view taken along the line M-M of FIG. 11.
Figure 13:
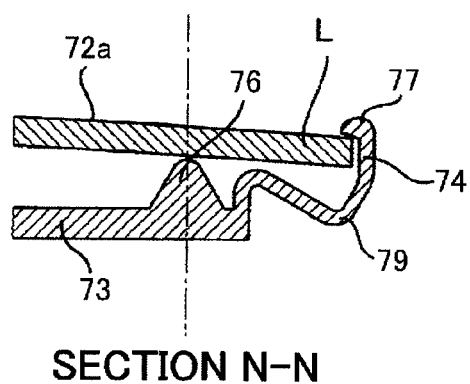
FIG. 13 A sectional view taken along the line N-N of FIG. 11.

FIG. 11 is a front view of the mirror 78 under a state in which the mirror main body 72 is fitted to the mirror holder 71, and FIGS. 12 and 13 respectively illustrate cross-sections taken along the lines M-M and N-N illustrated in FIG. 11. FIG. 12 illustrates a state in which the mirror main body 72 is supported by the protrusion member 75 formed in the mirror holder 71. The mirror main body 72 is supported in a point-contact manner by the support protrusion 75a of the protrusion member 75. In this manner, the mirror main body 72 can be easily moved in the longitudinal direction and the like with respect to the mirror holder 71. As a result, positional alignment when the mirror main body 72 and the mirror holder 71 are assembled is facilitated.

FIG. 13 illustrates a peripheral edge side surface portion of the mirror 78 under a state in which the mirror main body 72 and the mirror holder 71 are assembled. At a portion of the mirror holder 71 at which the bottom surface portion 73 is connected to the flange portion 74, a bending portion 79 is formed in part when viewed in cross section. With the bending portion 79, the flange portion 74 can possess a spring effect with respect to the bottom surface portion 73. With this, the mirror main body 72 can achieve an appropriate holding force, and the work of assembling the mirror main body 72 and the mirror holder is facilitated. Further, the mirror holder 71 has a long polygonal shape, and hence in a case of heat deformation, the deformation amount in the longitudinal direction becomes large. Particularly in a case of heat contraction, stress is applied to the peripheral edge portion of the mirror main body, which causes strain in the mirror main body 72. However, owing to the spring effect of the bending portion 79, the heat stress is alleviated, and it is possible to prevent generation of strain in the mirror main body 72.

In the present invention, when the mirror main body 72 is fixed to the mirror holder 71, adhesive tape or the like is unnecessary. Further, the structure is simplified, and hence the assembly is facilitated. As a result, operation man-hours are reduced, and hence the cost can be reduced. Further, the elastic protrusion 75b having a wave shape of the protrusion member 75 has a double supported beam structure, and hence it is possible to prevent elastic force reduction due to the deterioration over time, and possible to reliably hold the mirror main body 72. Further, the cone-shaped support protrusion 75a presses the rear surface of the mirror main body, and hence the positional alignment of the mirror main body 72 and the mirror holder 71 can be facilitated when those members are assembled.

Further, through formation of the bending shape at the portion of the mirror holder 71 at which the bottom surface portion 73 is connected to the flange portion 74, an appropriate holding force of the mirror main body can be achieved, and the assembly operation can be facilitated. Further, in addition to the protrusion member 75, the elastic support protrusion 76 is formed in the mirror holder 71. Still further, the elastic support protrusion 76 is provided on the outer side with respect to the protrusion member 75. In this manner, it is possible to prevent generation of strain in the mirror surface to be formed at the peripheral edge portion of the mirror.

The present invention is not limited to the above-described embodiment. Needless to say, various modifications may be made without departing from the scope of the invention.

For example, the cross-section shape of the ceiling portion 23 in the fitting portion 21 is not limited to the W-shape as described above, and the ceiling portion 23 may have a concentric wave pattern having more waves. Further, in the embodiments described above, a description is given of a structure in which the joint portion 11 has a convex shape (male side) and the fitting portion 21 or 34 has a concave shape (female side), but the concave-convex relationship may be reversed, and a structure in which the joint portion 11 has a concave shape and the fitting portion 21 or 34 has a convex shape may be employed. Still further, the mirror for a vehicle according to the present invention is applicable to an electrically foldable door mirror as well as a manually foldable door mirror, and further is applicable to vehicles other than an automobile (for example, industrial vehicles such as a constructing or mining machine).

The invention claimed is:

1. A mirror for a vehicle, comprising:
   a case member housed inside a mirror body to be fixed to a vehicle side, said case member including a joint portion having a hollow hemispherical shape, said joint portion having a spherical portion having a spherical shape;
   a pivot plate fitted to said case member, said pivot plate comprising a fitting portion mounted to said joint portion; and
   a mirror fitted to said pivot plate;
   wherein said joint portion includes:
      an outer wall having an outer spherical surface forming said spherical portion; and
      a support shaft extending upright at a center of said joint portion, said support shaft having a spherical upper surface;
   wherein said fitting portion includes:
      a spherical side wall portion having a curvature the same as a curvature of said spherical portion of said joint portion; and
      a ceiling portion integrally connected to an upper side of said side wall portion such that said ceiling portion and said side wall portion have a one-piece construction, said ceiling portion having a wave shape in cross section and having a concentric wave pattern lying inside a boundary defined by said side wall portion, said side wall portion being elastically deformable in a radial direction due to said concentric wave pattern ceiling portion; and wherein said ceiling portion has a spherical concave portion abutting against said spherical upper surface of said support shaft when said fitting portion is press-fitted to said joint portion, said spherical concave portion being formed at a center portion of said ceiling portion and having a curvature the same as a curvature of said spherical upper surface of said support shaft;

wherein said fitting portion is press-fitted to said joint portion while said side wall portion is elastically deformed outwardly in the radial direction;

wherein said side wall portion of said fitting portion contacts said outer wall of said joint portion so that said fitting portion is press-fitted to said joint portion, in which state a surface of said spherical concave portion of said ceiling portion is held in contact with said spherical upper surface of said support shaft;

wherein said pivot plate is pivotably fitted to said case member by press-fitting said fitting portion and said joint portion together; and wherein said ceiling portion is wave-shaped in cross section such that a rounded inner surface of an outer diameter portion of said ceiling portion is higher than a rounded inner surface of said center portion of said ceiling portion with respect to a base end of said support shaft so as to define a clearance between an upper surface of said outer wall of said joint portion and said rounded inner surface of said outer diameter portion of said ceiling portion, said clearance extending upward with respect to said base end of said support shaft so as to allow adjustment of an angle of said pivot plate relative to said case member.

2. The mirror for a vehicle according to claim 1, further comprising a ridge-shaped rib piece on an outer peripheral portion of said fitting portion, said rib piece being configured to increase a thickness and stiffness of said pivot plate, and to regulate a bending deformation of said pivot plate.

3. The mirror for a vehicle according to claim 2, further comprising a pivot spring mounted to said outer peripheral portion of said fitting portion, said fitting portion including a protrusion for regulating an axial movement of said pivot spring, said protrusion being located on said outer peripheral portion of said fitting portion.

4. The mirror for a vehicle according to claim 3, wherein said pivot spring is arranged between said protrusion and said rib piece, and is held between an upper surface of said rib piece and said protrusion.

5. The mirror for a vehicle according to claim 1, further comprising a rib piece between said fitting portion and a wall surface portion of said pivot plate, said fitting portion protruding from said pivot plate, said wall surface portion being arranged to oppose an outer peripheral portion of said fitting portion, said rib piece connecting said outer peripheral portion of said fitting portion and said wall surface portion.

* * * * *